(12) United States Patent
Arnold et al.

(10) Patent No.: US 11,467,017 B2
(45) Date of Patent: Oct. 11, 2022

(54) SENSING RODS WITH TIPS FOR FLUID DETECTION

(71) Applicant: HEWLETT-PACKARD DEVELOPMENT COMPANY, L.P., Spring, TX (US)

(72) Inventors: Christopher John Arnold, Vancouver, WA (US); Russell Sterling Sauer, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,761

(22) PCT Filed: Jul. 31, 2018

(86) PCT No.: PCT/US2018/044665
§ 371 (c)(1),
(2) Date: Oct. 24, 2019

(87) PCT Pub. No.: WO2020/027812
PCT Pub. Date: Feb. 6, 2020

(65) Prior Publication Data
US 2021/0356311 A1    Nov. 18, 2021

(51) Int. Cl.
*G01F 23/24*  (2006.01)
*B41J 2/175*  (2006.01)

(52) U.S. Cl.
CPC ........ *G01F 23/242* (2013.01); *B41J 2/17566* (2013.01); *G01F 23/243* (2013.01); *B41J 2002/17579* (2013.01)

(58) Field of Classification Search
CPC ......... B41J 2002/17579; B41J 2/17566; G01F 23/0007; G01F 23/241; G01F 23/242; G01F 23/243; G01F 23/02; G01F 23/268
See application file for complete search history.

(56) References Cited

U.S. PATENT DOCUMENTS

| 4,433,577 A | * | 2/1984 | Khurgin | G01F 1/52 |
| | | | | 73/216 |
| 4,879,902 A | * | 11/1989 | Loniello | G01F 23/242 |
| | | | | 73/304 C |
| 5,583,544 A | | 12/1996 | Stamer et al. | |
| | | (Continued) | | |

FOREIGN PATENT DOCUMENTS

| JP | 59202027 | 11/1984 |
| JP | 3548745 B2 | 7/2004 |
| JP | 5746448 B2 | 7/2015 |

*Primary Examiner* — Omeed Alizada
(74) *Attorney, Agent, or Firm* — Perry + Currier Inc

(57) ABSTRACT

An example of an apparatus is provided. The apparatus includes a current source. The apparatus includes a conductor in electrical communication with the current source and a conductive fluid in a reservoir. The apparatus includes a first sensing rod to extend into the reservoir, wherein the first sensing rod has a first diameter. The apparatus includes a tip disposed at an end of the first sensing rod to interact with a surface of the conductive fluid. The tip has a second diameter over a first portion of the tip adjacent to the first sensing rod. The second diameter is smaller than the first diameter. The apparatus includes a sensor to detect an electrical signal between the conductor and the first sensing rod.

14 Claims, 7 Drawing Sheets

(56) References Cited

U.S. PATENT DOCUMENTS

| | | | |
|---|---|---|---|
| 5,960,530 A * | 10/1999 | Kerr | G01F 23/268 |
| | | | 29/525 |
| 7,992,437 B2 | 8/2011 | Tshishiku | |
| 8,024,968 B2 | 9/2011 | Sabanovic et al. | |
| 9,649,846 B2 | 5/2017 | Kimura et al. | |
| 2004/0001004 A1 * | 1/2004 | Chamberlin | G01F 23/60 |
| | | | 340/623 |
| 2005/0012795 A1 | 1/2005 | Katayama | |
| 2006/0277992 A1 * | 12/2006 | Calabrese | G01F 23/266 |
| | | | 73/304 R |
| 2009/0278699 A1 | 11/2009 | Horst | |
| 2014/0371697 A1 * | 12/2014 | Braga | A61M 1/0001 |
| | | | 604/319 |

* cited by examiner

SENSING RODS WITH TIPS FOR FLUID DETECTION

BACKGROUND

Printing devices are often used to present information. In particular, printing devices may be used to generate output that may be easily handled and viewed or read by users. Accordingly, the generation of output from printing devices from electronic form is used for the presentation and handling of information. Some printing devices use print fluids to generate output. In such printing devices, the print fluids are generally stored in a reservoir from which a fluid transport system may draw print fluids. Accordingly, after prolonged use, the level of print fluid in the reservoir may be depleted. Therefore, in order to continue generating output, the fluid is to be replenished.

BRIEF DESCRIPTION OF THE DRAWINGS

Reference will now be made, by way of example only, to the accompanying drawings in which.

DETAILED DESCRIPTION

Some printing devices use fluids to generate output. In such printing devices, fluid delivery systems are generally used to deliver a liquid from one part of the printing device, such as a reservoir to a print head where output is generated. The reservoirs are generally used to store fluid such that the print head may be able to receive fluid upon demand during the generation of output. Since the fluid is used to generate the output, when the fluid in a reservoir is depleted, the generation of output may be impacted. For example, if the fluid in the reservoir was print fluid and the print fluid is depleted, the output generated may be no be as intended. Such output may not be useful and thus may be wasted. In addition, if the fluid is depleted below an inlet port on the reservoir, the inlet port may draw air into a fluid line which may subsequently damage components of the printing device not designed to handle air. Therefore, printing devices generally have sensors to determine when a reservoir is about to be depleted of fluid. In addition, for device management purposes, the level of the fluid in the reservoir may be provided so that additional fluid may be acquired by an administrator well in advance of depletion as well as manage and monitor costs associated with operating the printing device.

In instances where the fluid is a conductive fluid, such as a conductive liquid, electrical fluid detectors may be used determine the amount of fluid in a reservoir. For example, electrical contacts may be placed at certain locations within the reservoir to detect the presence of fluid. It is to be appreciated that the fluidic properties of each fluid may be different. For example, surface tension of the fluid in the reservoir may exhibit meniscus effects where the fluid may curve to maintain electrical communication with a contact even though the surface may generally be below the lever of the contact. Accordingly, this effect may decrease the accuracy of fluid level determination within the reservoir. It is to be appreciated that the manner by which the fluid interacts with contact at or near a surface of the fluid may vary across different fluids.

Figure 1:
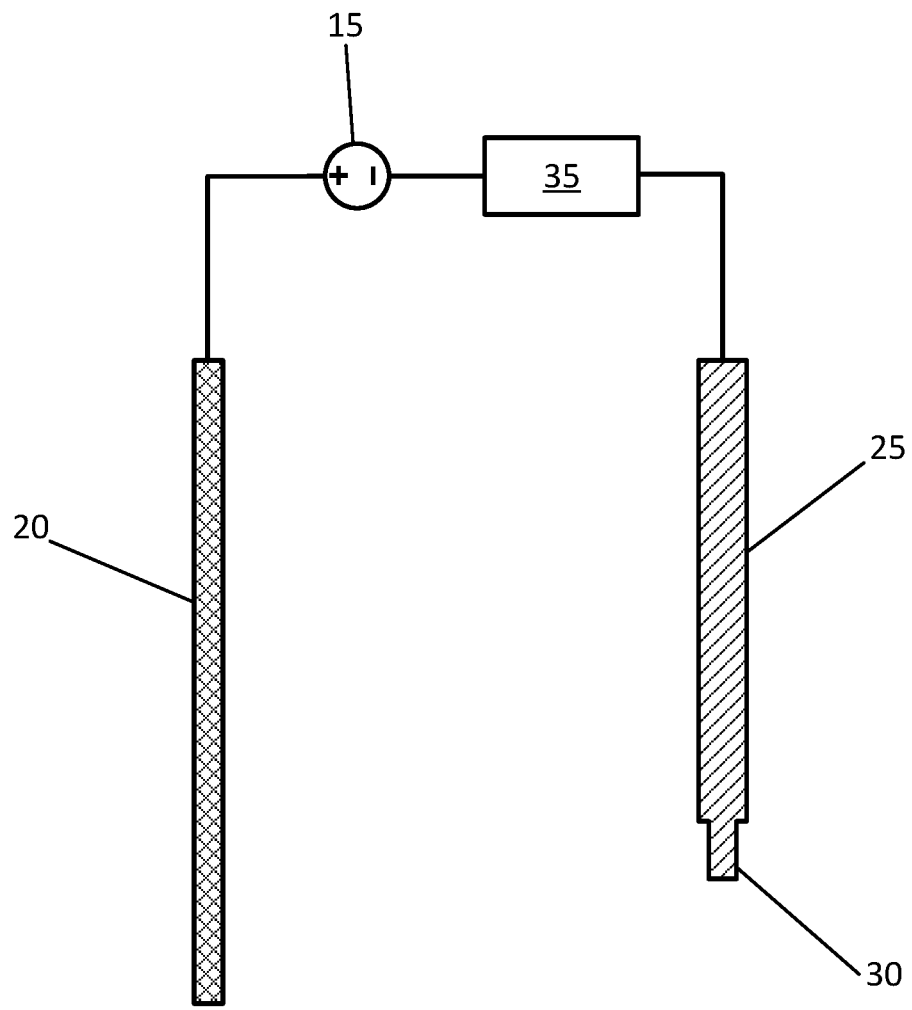
FIG. 1 is a schematic representation of an example apparatus to monitor a conductive fluid.
Figure 1:
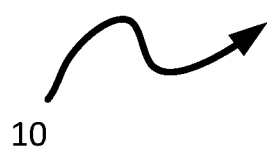

As used herein, any usage of terms that suggest an absolute orientation (e.g. "top", "bottom", "vertical", "horizontal", etc.) are for illustrative convenience and refer to the orientation shown in a particular figure. However, such terms are not to be construed in a limiting sense as it is contemplated that various components will, in practice, be utilized in orientations that are the same as, or different than those described or shown Referring to FIG. 1, an apparatus to monitor a conductive fluid is shown at 10. The apparatus 10 may be a part of the printing device or a separate component to operate on the printing device to make measurements. For example, the apparatus 10 may be inserted into a port on several different reservoirs which may be on the same printing device or different printing devices to measure the fluid level in each reservoir. The apparatus 10 may include additional components, such as various additional interfaces or displays to interact with a user or administrator or of the apparatus or to present information. In other examples, the apparatus 10 may include an interface to communicate with other components of the printing device to provide information relating to fluid levels. In the present example, the apparatus 10 includes a current source 15, a conductor 20, a sensing rod 25, a tip 30 disposed on the sensing rod 25, and a sensor 35.

The current source 15 is to deliver an electrical current to the conductor 20. The current source 15 is not particularly limited and may be any source of electricity. For example, the current source 15 may be powered from a direct current power supply in most printing devices. In other examples, the current source 15 may be powered by an external device or may have a separate power generation system, such as a solar panel. The amount of current provided by the current source is not limited and is to provide a baseline level of current for an electrical circuit. The baseline level of current is set to be high enough to obtain accurate measurements from the equipment such as the sensor 35. In addition, the voltage provided by the current source 15 may not be too high to avoid issues associated with arcing in the system.

The conductor 20 is in electrical communication with the current source 15. In the present example, the conductor 20 is a drive pin. In the present example, a drive pin may be a rod or other rigid structure extending into the reservoir through which a current may be delivered. The drive pin is not particularly limited and may include any material capable of conducting electricity. For example, the conductor 20 may be a metallic rod, such as a copper, gold, silver, stainless steel, and any other metal or metal alloy. In other examples, the conductor 20 may be a non-metallic conductive material, such as a carbon rod, or a semiconductor rod. It is to be appreciated that since the conductor 20 is to be generally in contact with the conductive fluid, the conductor 20 may be made from a corrosion resistant material. In other examples, the conductor 20 may have a protective coating to protect the conductive element. Since many protective coatings are generally not electrically conductive, an opening in the coating may be used to allow the conductive element to maintain electrical contact with the conductive fluid.

In the present example, the conductor 20 is a vertically oriented rod to extend from the top of a reservoir to a position proximate to the bottom of the reservoir. The conductor 20 is to extend to the bottom of the reservoir so that as electrical contact with the conductive fluid is maintained as the conductive fluid is depleted from the reservoir. In other examples, the conductor 20 may be disposed on a wall of the reservoir at or proximate to the lowest point in the reservoir. In further examples, the conductor 20 may be the wall of the reservoir. For example, the wall of the reservoir may be manufactured from a metallic or electrically conductive material.

The sensing rod 25 may be vertically oriented parallel to the conductor 20. In the present example, the sensing rod 25 extends into the reservoir. The amount that the sensing rod 25 extends into the reservoir is not particularly limited. For example, the sensing rod 25 may slightly into the top of the reservoir to monitor the level of the conductive fluid when the reservoir is substantially full. In other examples, the sensing rod 25 may extend to proximate to the bottom of the reservoir to monitor the level of the conductive fluid as the reservoir is substantially depleted. Monitoring low levels of conductive fluid in the reservoir may be used to prevent damage to a printing device when air is drawn into the fluid lines. In such examples, the sensing rod 25 and the apparatus 10 may be used to perform the functions of a warning system to alert an operator that corrective action is to be taken, such as filling the reservoir. In further examples, the apparatus 10 may operate as a safety interlock system to protect against the danger of damaging the printing device by either drawing too much air into the fluid lines and/or overfilling the reservoir.

It is to be appreciated that the sensing rod 25 is not particularly limited and may not be shaped as a rod in some examples. In some examples, the sensing rod 25 may be substituted with a wire, a conductive tube, or any other shape. In the present example, the sensing rod 25 has a substantially circular cross section with a substantially similar diameter to the conductor 20 (i.e. the drive pin). For example, the outside diameter of the sensing rod 25 may be about 2.5 mm. In other examples, the sensing rod 25 may be larger or smaller than the conductor 20. It is to be appreciated that as the diameter of the sensing rod 25 increases, the structural integrity of the sensing rod 25 is increased to make it less susceptible to bending or damage. Conversely, if the diameter of the sensing rod 25 is too large, the sensing rod 25 will occupy more space in the reservoir leaving less space for the conductive fluid. Accordingly, the dimensions of the sensing rod 25 may be varied depending on the material as well as the specific orientation of the sensing rod 25. For example, the sensing rod 25 may be scaled to accommodate a different reservoir size.

Furthermore, the sensing rod 25 is not particularly limited and may be made from any conductive material such as the same or similar material as the conductor 20. In the present example, the sensing rod 25 is to be in contact with the conductive fluid for a substantial amount of time. Accordingly, the sensing rod 25 may be made from a corrosion resistant material similar to the sensing rod 25. In some examples, the sensing rod 25 may have a protective coating to protect the conductive element such that the tip 30 may be exposed through the coating. Since many protective coatings are generally not electrically conductive, an opening in the coating may be used to allow the conductive element to maintain electrical contact with the conductive fluid. In some examples, the coating may not have an opening as long as the tip 30 may maintain contact with the conductive fluid.

The tip 30 is disposed at an end of the sensing rod 25 opposite the end connected to the current source 15. The tip 30 is to interact with a surface of the conductive fluid. The interaction between the tip 30 and the surface of the conductive fluid is not particularly limited and will be discussed in greater detail below. It is to be appreciated that the tip 30 may generally be submerged under the surface of the conductive fluid for extended period of time when the level of the conductive fluid in the reservoir is substantially higher than the position of the tip 30. Similarly, when the level of the conductive fluid is substantially below the tip 30, the tip 30 will not interacted with the conductive fluid.

It is to be appreciated that the tip 30 is not particularly limited and may have various shapes and sizes. In the present example, the tip 30 has a substantially circular cross section with a uniform diameter that is smaller than the diameter of the sensing rod 25. By having the tip 30 with a smaller diameter adjacent to the sensing rod 25, the profile of the sensing rod 25 and the tip 30 provide a step function. For example, the outside diameter of the tip 30 may be about 1.0 mm and the length of the tip 30 may be from about 2 mm to about 4 mm. In other examples, the tip 30 may be larger or smaller depending on the size of the reservoir and/or the properties of the conductive fluid. Furthermore, the dimensions of the tip 30 may be varied depending on the material from which the tip 30 is made.

The tip 30 is not particularly limited and may be made from any conductive material such as the same or similar material as the sensing rod 25. In the present example, the tip 30 is unitarily formed with the sensing rod 25. For example, the tip 30 may be machined using a lathe at the end of a conductive rod. It is to be appreciated that this is a simple manufacturing process that allows for the sensing rod 25 and tip 30 combination to be made at relatively low cost. In other examples, the tip 30 may be a separate part that is attached to the sensing rod 25. Accordingly, the tip 30 may be made from a different material than the sensing rod 25. The manner by which the tip 30 is connected to the sensing rod 25 is not particularly limited as long as the tip 30 is in electrical communication with the sensing rod 25. For example, the tip 30 may be connected using a fastener, a threading mechanism, a friction fit, or with a conductive glue.

The sensor 35 is in communication with the electronics of the apparatus 10 and is to detect an electrical signal between the conductor 20 and the sensing rod 25. The electrical signal detected is not limited. In the present example, the sensor 35 may be an ammeter inserted into an electrical path between the current source 15 and the sensing rod 25. As an alternative, the sensor 35 may be inserted between the current source and the conductor 20. In further examples, the current source 15 may have a built-in sensor to detect the current generated or a microprocessor or other chip may be used. In another example, the sensor 35 may be a voltmeter to measure a voltage drop between the conductor 20 and the sensing rod 25.

In operation, the apparatus 10 provides an indication of when a conductive fluid in a reservoir has dropped the level of the tip 30 on the sensing rod 25. By positioning the sensing rod 25 to a known position, the amount of conductive fluid in the reservoir may be detected as the surface of the conductive fluid passes over the tip 30. For example, if the sensor 35 measures a current flowing through from the current source to the conductor 20 and the sensing rod 25, the current be a baseline level while the tip 30 is submerged by the conductive fluid. As the fluid level drops in the reservoir and the surface approaches the tip 30, the tip will begin to interact with the surface due to the properties of the conductive fluid, such as the surface tension, to create meniscus effects. Once the surface of the conductive fluid drops significantly below the tip 30, electrical communication with the tip 30 will be lost creating an effective open circuit causing the current to drop substantially to zero.

It is to be appreciated that during the surface interaction with the tip 30, the current drops from the baseline level to substantially zero. The dimensions and shape of the tip 30, along with the properties, such as the surface tension, may affect the manner by which the current decreases as the surface passes the tip 30. In particular, the current may decrease in a substantially linear manner, or the current may effectively drop off similar to a step function at some point. Furthermore, the consistency and accuracy of detecting the overall level of the conductive fluid may be poor if meniscus effects are inconsistent such as when the surface sticks to the tip 30 as the level of the conductive fluid in the reservoir drops below the tip 30.

It is to be appreciated that some characteristics of response of the tip 30 as the surface passes over the tip 30 may be useful for measuring the level of the conductive fluid. For example, a characteristic is that the tip 30 may provide a linear or substantially linear region of current change as the conductive fluid drops below the sensing rod 25 and passes over a portion of the tip 30 with a uniform diameter. The substantially linear response region allows for a warning that the conductive fluid is about to drop below a level in the reservoir that is associated with the tip 30. As another example of a characteristic that may be useful, the tip 30 may provide a sharp drop region where the current changes rapid to substantially zero. This may be when the surface of the conductive fluid reaches proximate to the lower end of the tip 30 and breaks electrical contact. It is to be appreciated that the properties of the conductive fluid and the shape of the tip may play a significant role in achieving this characteristic. In particular, the meniscus effects are to be controlled such that the surface of the conductive fluid does not curve up to the tip 30 after the level of the surface has dropped below the lower end of the tip 30. If the surface tension causes the conductive fluid to maintain electrical communication with the tip 30 after the level has dropped below the tip 30, the current may continue to gradually drop off as the meniscus connecting to the tip 30 gets thinner. Accordingly, this will provide for an inaccurate level determination as there is not clear cutoff indicating the surface of the conductive fluid has dropped below the know position in the reservoir.

Figure 2:
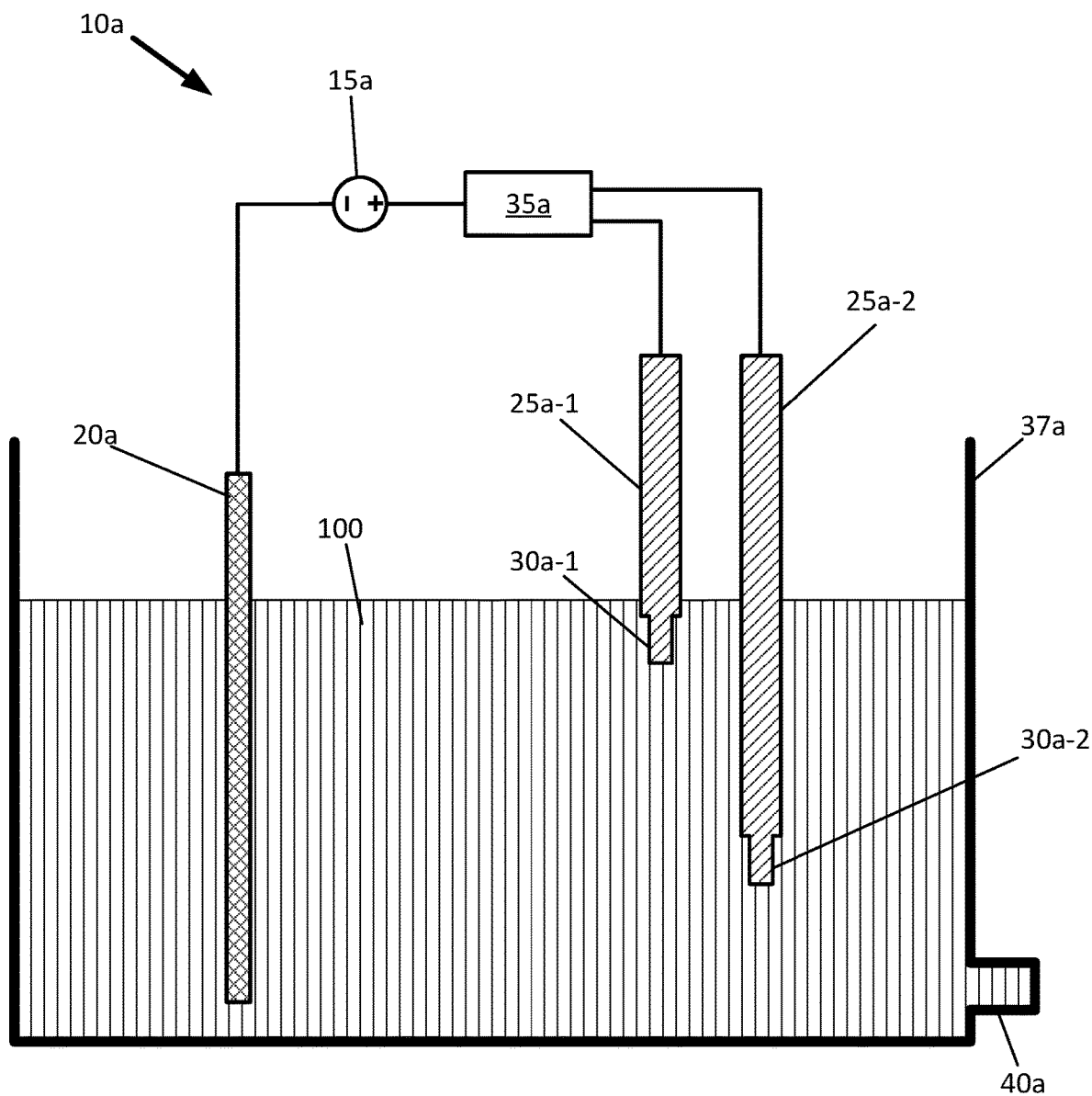
FIG. 2 is a schematic representation of another example apparatus to monitor a conductive fluid with a substantially full reservoir.
Figure 3:
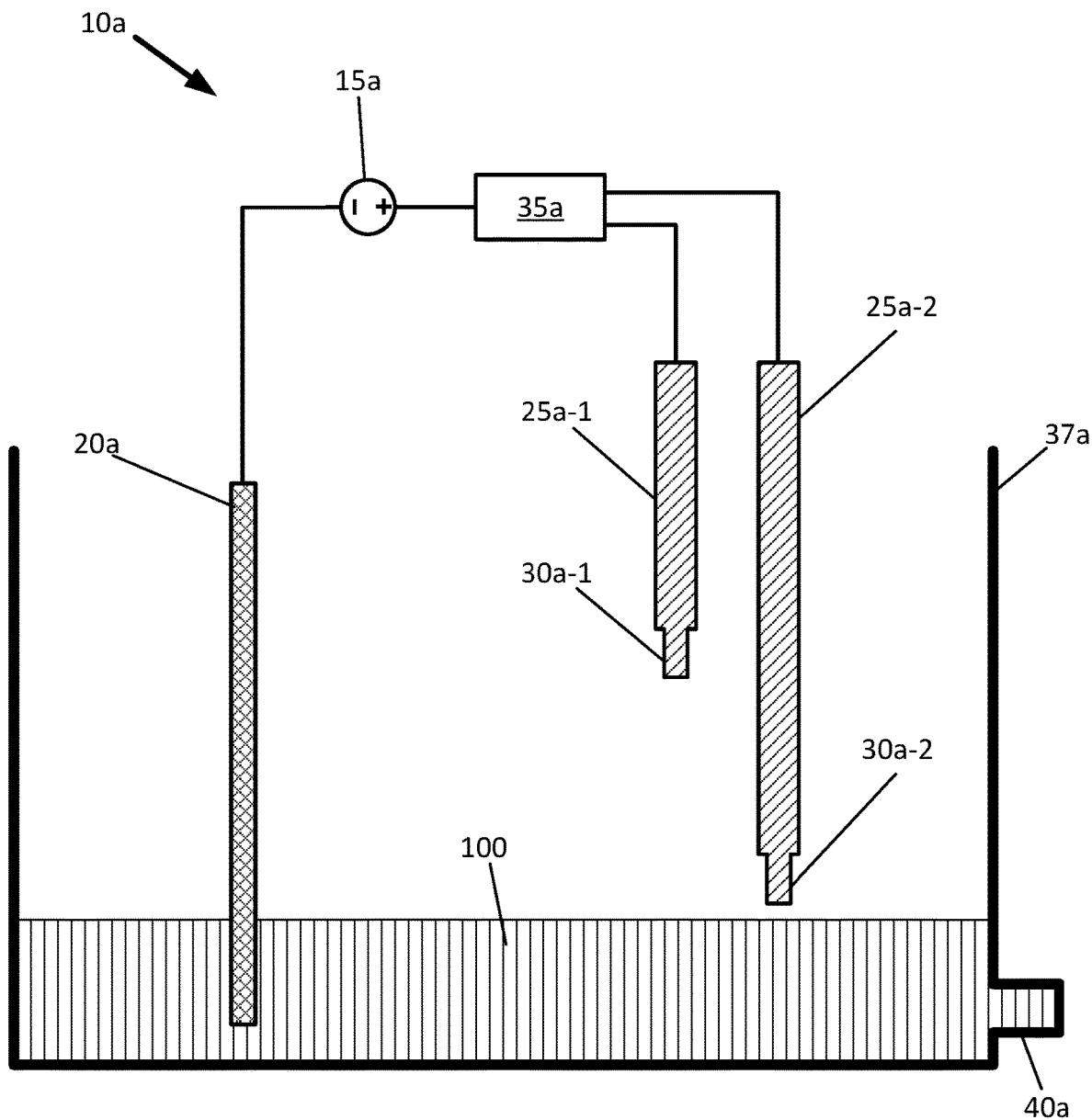
FIG. 3 is a schematic representation of the example apparatus of FIG. 2 with a substantially full reservoir.

Referring to FIGS. 2 and 3, another apparatus to monitor a conductive fluid is shown at 10a in a reservoir 37a with different levels of conductive fluid 100. Like components of the apparatus 10a bear like reference to their counterparts in the apparatus 10, except followed by the suffix "a". The apparatus 10a may be a part of the printing device or a separate component to operate on the printing device to make measurements. The apparatus 10a may include additional components, such as various additional interfaces or displays to interact with a user or administrator or of the apparatus or to present information. In other examples, the apparatus 10a may include an interface to communicate with other components of the printing device to provide information relating to fluid levels in the reservoir 37a. In the present example, the apparatus 10a includes a current source 15a, a conductor 20a connected to the current source 15a, sensing rods 25a-1 and 25a-2 (generically, these sensing rods are referred to herein as "sensing rod 25a" and collectively they are referred to as "sensing rods 25a", this nomenclature is used elsewhere in this description), tips 30a-1 and 30a-2 disposed on the sensing rods 25a-1 and 25a-2, respectively, and a sensor 35a.

The reservoir 37a is to store the conductive fluid 100. The reservoir 37a includes a housing having walls to define a cavity. The cavity is not limited and may be any shape designed to provide conductive fluid 100 during operation of the printing device. Accordingly, the reservoir 37b is to receive the conductive fluid 100 from an external storage container for use during a printing operation.

In the present example, the apparatus 10a includes two sensing rods 25a extending to different positions within the reservoir 37a. By fixing the positions of the sensing rods 25a, the amount of conductive fluid in the reservoir 37a may be determined. For example, as shown in FIG. 2, both tips 30a are submerged in the conductive fluid 100 to form closed circuits. Accordingly, the level of the conductive fluid 100 in FIG. 2 may be considered to be substantially full. In FIG. 3, both tips 30a are not in contact and thus not in electrical communication with the conductive fluid 100. Therefore, there is an open circuit with respect to both of the sensing rods 25a and the level of the conductive fluid 100 in FIG. 3 may be considered to be substantially empty. It is to be appreciated that the level of the conductive fluid 100 may be between the tip 30a-1 and the tip 30a-2 in which one closed circuit and one open circuit may be detected.

In the present example, the sensing rods 25a are to connect with the sensor 35a. The sensing rod 25a-1 extends to a position proximate to the top of the reservoir 37a, where the tip 30a-1 may provide an indication when the reservoir 37a is substantially full. This indication may be used by an operator of a printing device to determine how much output may be generated by the reservoir before it is to be refilled. In addition, the sensing rod 25a-1 may also be used to provide an indication of when the reservoir 37a is near full such that it may indicate when a filling process is to be at or near completion. The indication of when a filling process is complete may reduce the likelihood of overfilling the reservoir 37a and wasting fluid. Continuing with this example, the sensing rod 25a-2 extends to a position proximate to the bottom of the reservoir 37a, where the tip 30a-2 may provide an indication when the reservoir 37a is substantially empty. As shown in FIG. 3, this indication may be provided prior to the level of the conductive fluid 100 dropping below the outlet 40a to avoid air from being drawn into a fluid line via the outlet 40a.

The tips 30a are disposed at an end of the sensing rods 25a opposite the end connected to the current source 15. The tips 30a are to interact with a surface of the conductive fluid and may be similar to the tip 30 described above. By having multiple tips 30a, it is to be appreciated that the level of the conductive fluid 100 may be determined at several positions to provide an indication of an amount conductive fluid 100 in the reservoir 37a.

The sensor 35a is in communication with the electronics of the apparatus 10a and is to detect an electrical signal from the conductor 20 via the sensing rods 25a. In the present example, the sensor 35a uses two channels where the sensing rod 25a-1 is connected to one channel and the sensing rod 25a-1 is connected to another channel. he electrical signal detected on each channel is not limited. In the present example, the sensor 35a may include a plurality of ammeters inserted into an electrical path between the current source 15a and each of the sensing rods 25a. In further examples, the current source 15a may have a built-in sensor to detect the current via each circuit for each sensing rod 25a. In another example, the sensor 35a may be a plurality of voltmeters to measure voltage drops between the conductor 20 and each of the sensing rods 25a.

Figure 4:
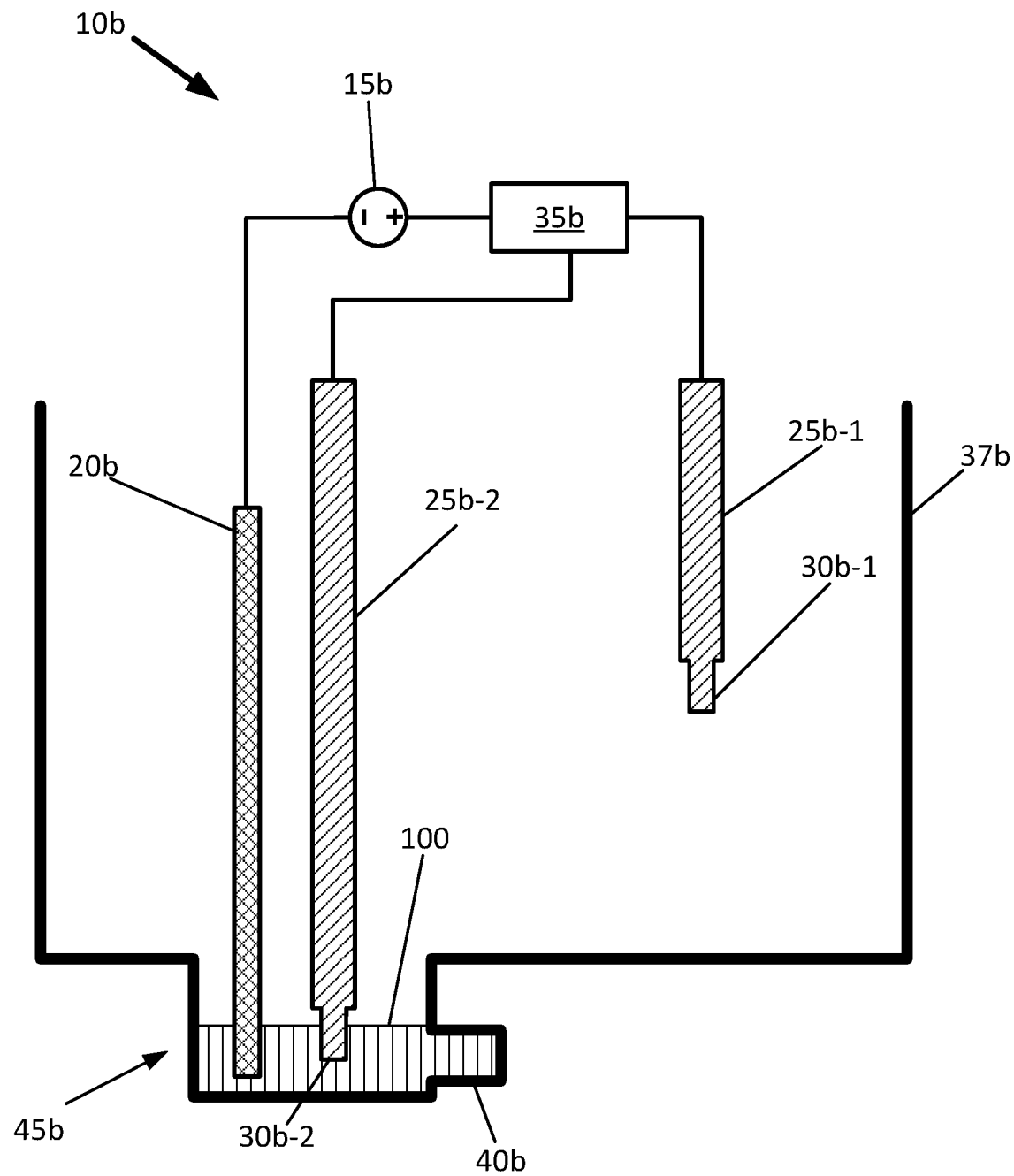
FIG. 4 is a schematic representation of another example apparatus to monitor a conductive fluid with a well.

Referring to FIG. 4, another apparatus to monitor a conductive fluid is shown at 10b in a reservoir 37b. Like components of the apparatus 10b bear like reference to their counterparts in the apparatus 10a, except followed by the suffix "b". In the present example, the apparatus 10b includes a current source 15b, a conductor 20b, sensing rods 25b-1 and 25b-2, tips 30b-1 and 30b-2 disposed on the sensing rods 25b-1 and 25b-2, respectively, and a sensor 35b.

In the present example, the reservoir 37b includes an outlet 40b and a well 45b. The well 45b is formed at a bottom of the reservoir 37b to increase the sensitivity of the sensitivity of the tip 30b-1 on the sensing rod 25b-1 to a volume change of the conductive fluid 100. The sensitivity of the tip 30b-1 to a volume change is increase due to the smaller cross section of the reservoir 37b. Accordingly, as the conductive fluid 100 is drawn out of the reservoir 37b via the outlet 40b, the height change in the well 45b is larger than for the rest of the reservoir. The increase in the change of the height provides for an amplified response as the surface of the conductive fluid 100 will pass over the tip 30b-1 quicker than as the surface may have passed over the tip 30b-2.

It is to be appreciated that in the present example, the apparatus 10b is substantially similar to the apparatus 10a with the exception of the placements of the sensing rods 25b and the tips 30b where the tip 30b-1 is placed into a well 45b.

Figure 5A:
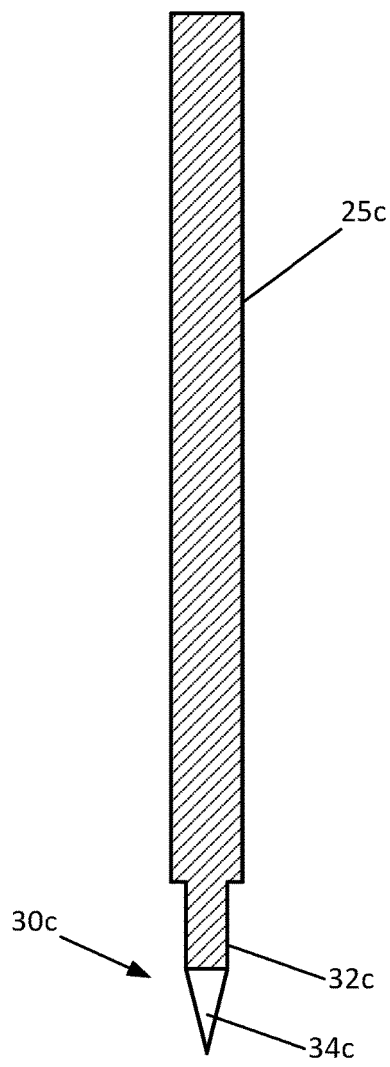
FIGS. 5a-c are representations of an example sensing rod with (a) a tapered portion; (b) a bulb; and (c) a widening portion.

Referring to FIG. 5a, an example of a sensing rod 25c and tip 30c is shown in greater detail. In the present example, the sensing rod 25c is substantially similar to the sensing rod 25. In this example, the tip 30c includes a uniform portion 32c and a tapered portion 34c. The proportions of the various portions of the tip 30c are not limited and may be adjusted or changed for fluids with different properties or different types of reservoirs. In the present example, the uniform portion 32c may have an outside diameter of about 1.0 mm and a length of about 4.0 mm. The tapered portion 34c may have a taper of about 15 degrees off the longitudinal axis to substantially a point.

Figure 5B:
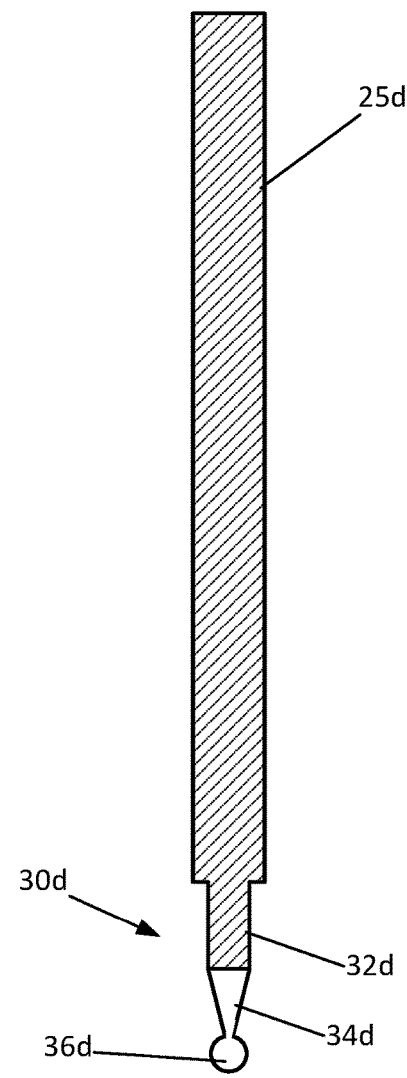

Referring to FIG. 5b, another example of a sensing rod 25d and tip 30d is shown in greater detail. In the present example, the sensing rod 25d is substantially similar to the sensing rod 25. In this example, the tip 30d includes a uniform portion 32d, a tapered portion 34d, and a bulb 36d. The proportions of the various portions of the tip 30d are not limited and may be adjusted or changed for fluids with different properties or different types of reservoirs. In the present example, the uniform portion 32d may have an outside diameter of about 1.0 mm and a length of about 4.0 mm. The tapered portion 34d may have a taper of about 15 degrees off the longitudinal axis to a diameter of about 0.25 mm. The bulb 36d is disposed adjacent to a narrow point of the tapered portion 34d and may be a spherical feature with a diameter of about 1.0 mm. In other examples, the bulb 36d may be varied to be larger or smaller. For example, the bulb 36d may be have a diameter as small as about 0.5 mm or as large as 2.0 mm. In other examples, the bulb 36d may not be spherical and may be elongated or asymmetrical.

Figure 5C:
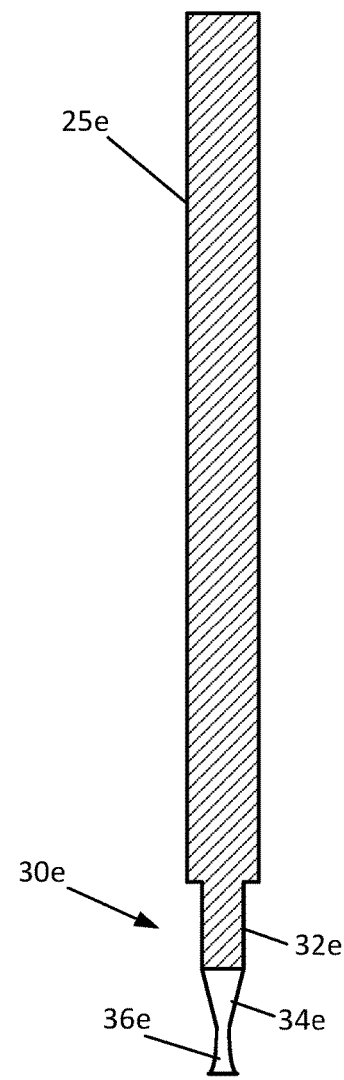

Referring to FIG. 5c, another example of a sensing rod 25e and tip 30e is shown in greater detail. In the present example, the sensing rod 25e is substantially similar to the sensing rod 25. In this example, the tip 30e includes a uniform portion 32e, a tapered portion 34e, and a widening portion 36e. The proportions of the various portions of the tip 30e are not limited and may be adjusted or changed for fluids with different properties or different types of reservoirs. In the present example, the uniform portion 32e may have an outside diameter of about 1.0 mm and a length of about 4.0 mm. The tapered portion 34e may have a taper of about 15 degrees off the longitudinal axis to a diameter of about 0.25 mm. The widening portion 36e is disposed adjacent to a narrow point of the tapered portion 34e and may have a reverse taper of 15 degrees off the longitudinal axis to a diameter of about 0.75 mm. In other examples, the widening portion 36e may be varied to be larger or smaller. For example, the widening portion 36e may widen to 0.5 mm or as large as 1.0 mm. In other examples, the widening portion 36e may have additional features at an end or may not be linear taper.

Figure 6:
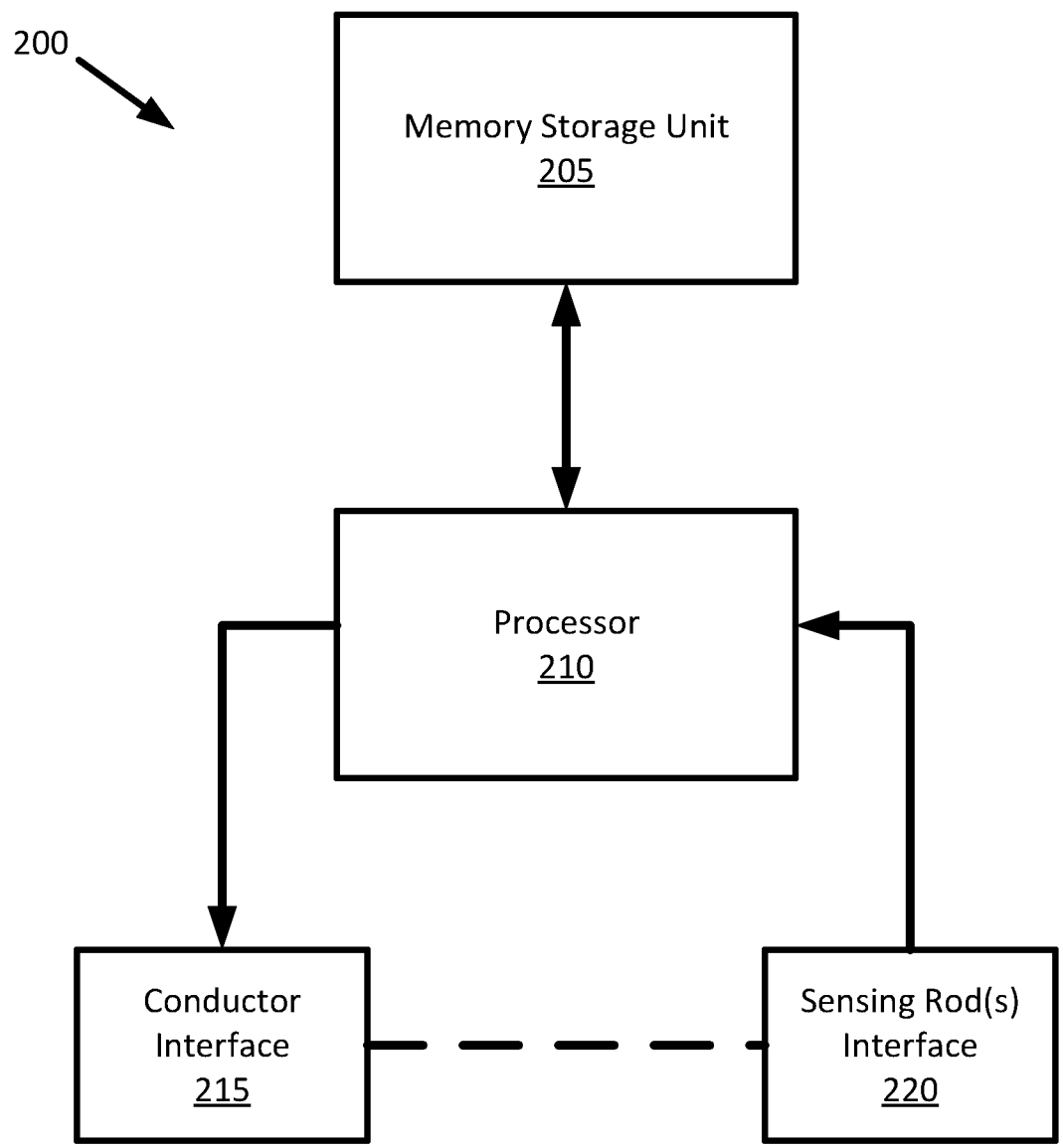
FIG. 6 is a block diagram of an example device to determine fluid levels.

Referring to FIG. 6, a device to determine fluid levels using the apparatus 10 is shown generally at 200. The device 200 may be a part of the control components of a printing device or a separate component for monitoring fluid levels. The device 200 may include additional components, such as various additional interfaces and/or displays to interact with a user or administrator of the apparatus. In the present example, the device 200 includes a memory storage unit 205, a processor 210, a conductor interface 215 and a sense rod interface 220.

The memory storage unit 205 is coupled to the processor 210 and may include a non-transitory machine-readable storage medium that may be any electronic, magnetic, optical, or other physical storage device. In the present example, the memory storage unit 205 is to store executable instructions. In the present example, the executable instructions may include a set of instructions to execute various steps to determine the amount of conductive fluid in a reservoir. The non-transitory machine-readable storage medium may include, for example, random access memory (RAM), electrically-erasable programmable read-only memory (EEPROM), flash memory, a storage drive, an optical disc, and the like.

The processor 210 may include a central processing unit (CPU), a microcontroller, a microprocessor, a processing core, a field-programmable gate array (FPGA), an application-specific integrated circuit (ASIC), or similar. The processor 210 and the memory storage unit 205 may cooperate to execute various instructions. The processor 210 may execute instructions stored on the memory storage unit 205 to implement various processes discussed in greater detail below. In other examples, the processor 210 may also be used to implement an ongoing monitoring process to continually monitor fluid levels. The monitoring processes are not limited and may involve monitoring periodic signals from a sensor.

The conductor interface 215 and the sense rod interface 220 are to communicate with a conductor 20 and a sense rod 25, respectively. In the present example, the conductor interface 215 is to send a signal to the via the conductor 20 and to detect a response via the sense rod 25 to determine if fluid is present at the tip 30 of the sense rod 25.

Figure 7:
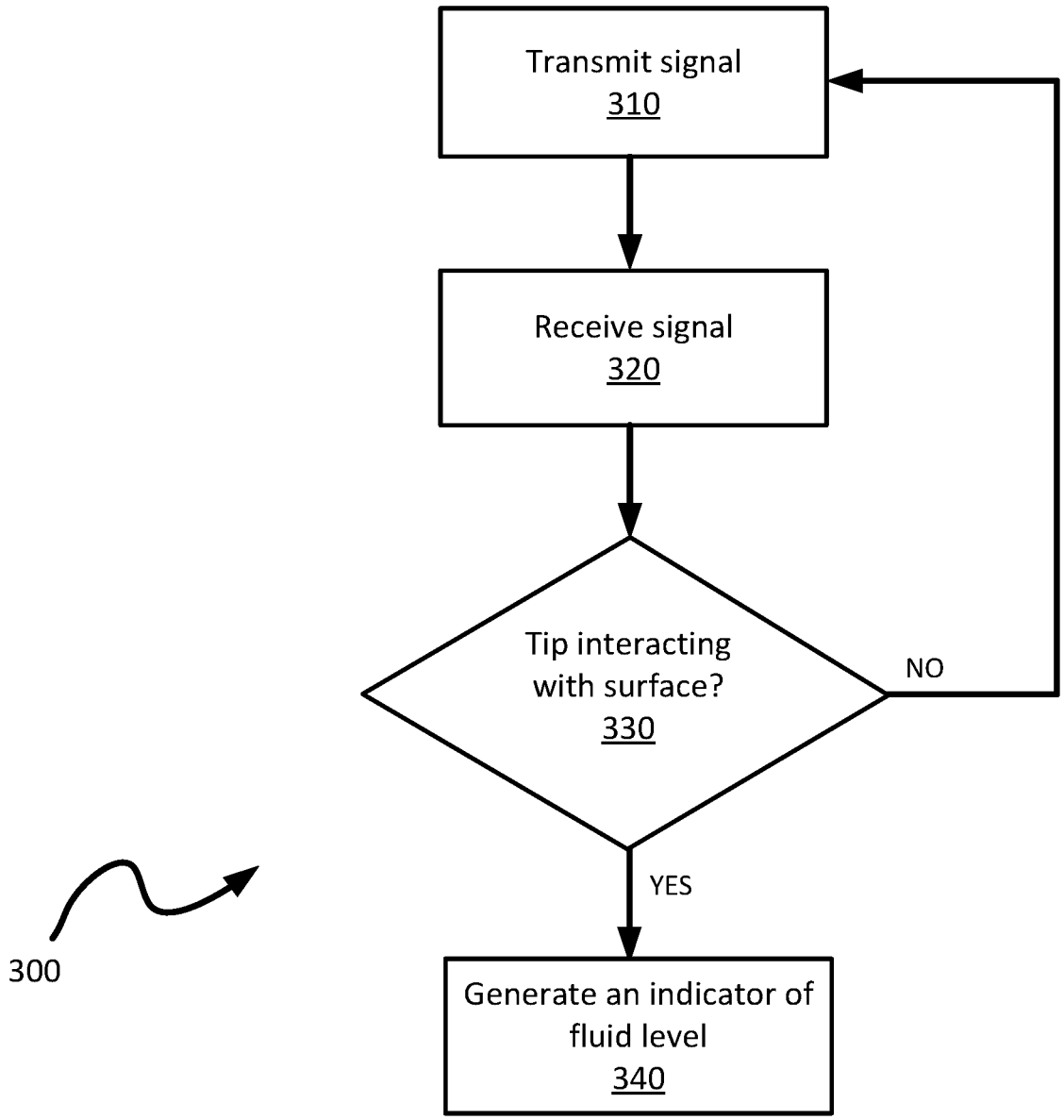
FIG. 7 is a flowchart of an example of a method of determining fluid levels.

Referring to FIG. 7, a flowchart of a method to monitor a conductive fluid is shown at 300. In order to assist in the explanation of method 300, it will be assumed that method 300 may be performed with the device 200 operating the apparatus 10. Indeed, the method 300 may be one way in which apparatus 10 may be configured and the device 200 may be operated. Furthermore, the following discussion of method 300 may lead to a further understanding of the apparatus 10 and its various components.

Block 310 involves transmitting a signal via the conductor 20. In the present example, the processor 210 may send a command to the conductor interface 215 to transmit the signal to the conductor 20, which is in electrical communication with conductive fluid. It is to be appreciated that in some examples, the conductor interface 215 may be able to generate a signal (i.e. a current) and act as the current source 15. The signal transmitted to the conductor 20 will travel through the conductive fluid to the sensing rod 25.

At block 320, the sense rod interface 220 receives the signal via the sense rod 25 if there is electrical communication between the sense rod 25 and the conductive fluid.

Block 330 involves determining whether the signal received at block 320 indicates that the tip 30 is interacting with a surface of the conductive fluid. The manner by which the determination is made is not particularly limited. For example, the strength of the signal received at block 320 may be used to make the determine such that if the signal received is below a certain threshold value, the processor 210 will determine that the tip 30 is interacting with the surface of the conductive fluid and proceed to block 340. If the processor determines that the tip 30 is not interacting with the surface, the processor 210 will loop back to block 310 and continue the monitoring process. It is to be appreciated that in the loop back to block 310, the processor 210 may insert a waiting period to so that the monitoring process will not use excessive processing resources.

At block 340, the processor 210 generates an indicator of the level of the conductive fluid. The indicator is not particularly limited and may involve a light or some other visual display on the printing device. In other examples, the indicator may be a message send to a control system of the printing device. In examples with more than one sensing rod, the indicator may further include information to identify a more accurate level of the conductive fluid in the reservoir.

It is to be appreciated that in examples where the tip 30 provides an initial substantially linear region of decreasing signal, the method 300 may be modified to provide a two-step warning system. For example, an initial warning may be provided during the beginning of the gradual decrease in signal strength and a second warning may be provided during a sharp drop off in signal strength It should be recognized that features and aspects of the various examples provided above may be combined into further examples that also fall within the scope of the present disclosure.

What is claimed is:

1. An apparatus comprising:
a current source;
a conductor in electrical communication with the current source and a conductive fluid in a reservoir;
a first sensing rod to extend into the reservoir, wherein the first sensing rod has a portion with a first diameter that is extended into the reservoir;
a tip with a second diameter disposed at an end of the portion of the first sensing rod extended into the reservoir to interact with a surface of the conductive fluid, wherein the tip includes a uniform portion with the second diameter that is smaller than the first diameter, a tapered portion with the second diameter that tapers to a third diameter that is smaller than the second diameter, and a widening portion that reverse tapers to a fourth diameter; and
a sensor to detect an electrical signal between the conductor and the first sensing rod.

2. The apparatus of claim 1, wherein the portion of the first sensing rod has a uniform diameter.

3. The apparatus of claim 2, further comprising a second sensing rod to extend into the reservoir, wherein the first sensing rod extends to a first position and the second sensing rod extends to a second position.

4. The apparatus of claim 3, wherein the first position is proximate to a top of the reservoir to provide an indication that a filling process is complete.

5. The apparatus of claim 3, wherein the second position is proximate to a bottom of the reservoir to provide an indication that the reservoir is substantially empty.

6. The apparatus of claim 2, wherein the tapered portion extends from the uniform portion of the tip.

7. The apparatus of claim 6, wherein the tip has a bulb disposed adjacent to the tapered portion at a narrow point.

8. The apparatus of claim 6, wherein the widening portion is adjacent to the tapered portion at a narrow point.

9. A fluid reservoir comprising:
a housing defining a cavity to receive a fluid;
a conductor to connect with a current source, wherein the conductor is to provide a current to the fluid;
a sensing rod to connect with a sensor to detect an electrical signal from the conductor, wherein the sensing rod extends from the housing to a position in the cavity, and wherein the sensing rod has a first diameter; and
a tip disposed at an end of the sensing rod to interact with a surface of the fluid, wherein the tip includes a uniform portion with a second diameter that is smaller than the first diameter, a tapered portion with the second diameter that tapers to a third diameter that is smaller than the second diameter, and a widening portion that reverse tapers to a fourth diameter.

10. The fluid reservoir of claim 9, wherein the housing includes a well formed at a bottom to increase sensitivity of the tip to a volume change.

11. The fluid reservoir of claim 9, wherein the tip has a bulb disposed adjacent to the widening portion.

12. The fluid reservoir of claim 11, wherein the tip has a widening portion adjacent to the tapered portion at a narrow point.

13. A non-transitory machine-readable storage medium encoded with instructions executable by a processor, the non-transitory machine-readable storage medium comprising:
instructions to transmit a signal to a conductor in electrical communication with conductive fluid in a reservoir;
instructions to receive the signal from a sensing rod in the reservoir, wherein the sensing rod has a first diameter; and
instructions to determine when a tip disposed at an end of the sensing rod interacts with a surface of the conductive fluid, wherein the tip includes a uniform portion with a second diameter that is smaller than the first diameter, a tapered portion with the second diameter that tapers to a third diameter that is smaller than the second diameter, and a widening portion that reverse tapers to a fourth diameter that forms a bulb.

14. The non-transitory machine-readable storage medium of claim 13, comprising instructions to generate an indicator of a level of the conductive fluid in a reservoir when the tip interacts with the surface.

* * * * *